United States Patent [19]
Lagoni

[11] Patent Number: 5,204,748
[45] Date of Patent: Apr. 20, 1993

[54] BEAM CURRENT LIMITING ARRANGEMENT FOR A TELEVISION SYSTEM WITH PICTURE-IN-PICTURE PROVISIONS

[75] Inventor: William A. Lagoni, Indianapolis, Ind.

[73] Assignee: Thomson Consumer Electronics, Inc., Indianapolis, Ind.

[21] Appl. No.: 805,486

[22] Filed: Dec. 11, 1991

[51] Int. Cl.[5] .................. H04N 5/455; H04N 5/59
[52] U.S. Cl. ........................ 358/169; 358/183; 358/243
[58] Field of Search ............ 358/243, 169, 183, 22, 358/168

[56] References Cited

U.S. PATENT DOCUMENTS

| | | | |
|---|---|---|---|
| 4,220,972 | 9/1980 | Geokezas et al. | 358/169 X |
| 4,231,065 | 10/1980 | Fitch et al. | 358/169 X |
| 4,451,840 | 5/1984 | Shanley, II | 358/169 X |
| 4,520,397 | 5/1985 | Hibi | 358/243 X |
| 4,549,217 | 10/1985 | Sendelweck | 358/243 |
| 4,549,218 | 10/1985 | Norley et al. | 358/243 |
| 4,947,253 | 8/1990 | Neal | 358/183 X |

OTHER PUBLICATIONS

U.S. Patent Application Ser. No. 695,809, "Television Receiver With Picture In Picture and Non-Linear Processing", filed for Lineberry on May 6, 1991.

U.S. Patent Application Ser. No. 751,810, "Video System Including Apparatus for Deactivating an Automatic Control Arrangement", filed for Lagoni, et al. on Aug. 30, 1991.

CTC 168/169 Technical Training Manual, published in 1990 by Thomson Consumer Electronics, Indianapolis, Indiana pp. 66–88.

Primary Examiner—James J. Groody
Assistant Examiner—Mark R. Powell
Attorney, Agent, or Firm—Joseph S. Tripoli; Peter M. Emanuel

[57] ABSTRACT

In a color television system having picture-in-picture (PIP) capability, apparatus is provided for automatically modifying the operation of a beam current limiting (BCL) section while the small picture is being displayed to prevent the visibility of the small picture from being adversely affected. In the preferred embodiment, a contrast BCL control signal is decoupled from the contrast section, and a substitute control signal, at least approximating the user responsive contrast control signal, is substituted for it in response to a switching signal which causes the small picture to be inserted within the big picture. However, the BCL section continues to be responsive to the beam current during the time interval in which the small picture is displayed so that the BCL contrast signal accurately represents the contents of the entire image. In addition, the operation of an automatic contrast reduction section which is responsive to a peak-white representative video signal is also disabled during the time interval in which the small picture is displayed. In an alternate embodiment only the operation of the contrast BCL section is disabled, but the operation of the automatic contrast control is maintained. If desired, a brightness BCL control signal may also be decoupled from the brightness section.

20 Claims, 3 Drawing Sheets

BEAM CURRENT LIMITING ARRANGEMENT FOR A TELEVISION SYSTEM WITH PICTURE-IN-PICTURE PROVISIONS

FIELD OF THE INVENTION

The invention concerns a beam current limiting arrangement for a television receiver or monitor with provisions for displaying a small or auxiliary picture within a big or main picture within the same image, e.g., in a so-called picture-in-picture configuration.

BACKGROUND OF THE INVENTION

Some television receivers and monitors have so-called "picture-in-picture" (PIP) provisions for displaying a small picture corresponding to a video signal provided by an auxiliary video signal source within a large or main picture corresponding to a video signal provided by a main signal source. In a television receiver, the main video signal source may be the primary tuner of the television receiver and the auxiliary video signal source may be a second tuner included within the television receiver itself or within an external VCR coupled to the television receiver, or some other composite video signal source such as a VCR.

Television receivers and monitors usually include a beam current limiting (BCL) arrangement which controls contrast and/or the brightness characteristics of the video signals coupled to the picture tube in order to limit the beam current drawn by the picture tube. Beam current limiting is also referred to in the art as automatic beam limiting (ABL). The purpose of a BCL arrangement is to ensure that excessive beam currents, which may cause so-called "white spot blooming" and which may also cause damage to the picture tube, are not produced. A BCL arrangement senses the average current drawn by the picture tube from the high voltage transformer which supplies high operating voltages to the picture tube. Usually, the BCL arrangement generates a control signal for reducing the gain of the video signal processing channel to thereby reduce the peak-to-peak amplitude of the video signals coupled to the picture tube when the level of the beam current exceeds a predetermined threshold. The peak-to-peak amplitude of the video signals is related to the contrast of the reproduced image. The BCL arrangement may also generate a control signal for reducing the DC levels of the video signals coupled to the picture tube and thereby the brightness of the reproduced image.

A copending patent application Ser. No. 695,809, entitled TELEVISION RECEIVER WITH PICTURE IN PICTURE AND NON-LINEAR PROCESSING, filed on May 6, 1991 for R. L. Lineberry concerns a television system with both picture-in-picture and so called non-linear "black stretch" signal processing provisions. A non-linear "black-stretch" signal processing section operates to control the amplitudes of relatively low level video signals between black and a grey level in response to the average video signal level (sometimes referred to as the average picture level or simply as APL). More specifically, the amplitudes of low level video signals are increased for relatively dark scenes (i.e., scenes having low APL) and are relatively decreased for brighter scenes (i.e., scenes having higher APL). In the receiver described in the Lineberry patent application, the non-linear "black-stretch" signal processing operation is disabled during the PIP mode of operation while the small picture is being displayed. As a result, image details of dark scenes of the small picture will not be lost because of the reduction of the amplitudes of low level video signals by the "black-stretch" section in response to a high APL of bright scenes of the big picture.

SUMMARY OF THE INVENTION

An aspect of the invention concerns the recognition that while BCL arrangements are usually thought to operate to inhibit excessive beam currents and are therefore normally inoperative, the operation of a BCL arrangement may adversely affect the visibility of the small picture produced by a television receiver or monitor with PIP provisions. For example, in large screen television receivers and monitors, the nominal gain of a video channel may be set to a relatively high level in order to maintain a relatively high average image brightness. In such situations, the BCL arrangement will be operative during a significant amount of time even with "normal" video signals and will reduce the contrast of a small picture which is inserted within a big picture during PIP mode of operation will be reduced to the same degree as that of the big picture. Moreover, while a non-linear "black-stretch" signal processing section, with which the Lineberry application is concerned, affects mid-range to low level portions of video signals, BCL contrast reduction affects the entire amplitude range of the video signals. Thus, the operation of the BCL arrangement tends to reduce the visibility of the small picture. Accordingly, another aspect of the invention concerns the recognition of the desirability of modifying the operation of the BCL arrangement during the time interval in which the small picture is being displayed to avoid unnecessary degradation of the small picture. This is made possible because the contribution of the small picture to the average beam current is small considering the relative sizes of the main and small pictures.

Still another aspect of the invention concerns a particular arrangement of apparatus for modifying the operation of the BCL arrangement during the time interval in which the small picture is being displayed.

A further aspect of the invention concerns the recognition that the manner in which the operation of the BCL arrangement is modified while the small picture is being displayed should not substantially affect the operation of the BCL arrangement for the big picture is being displayed. A still further aspect of the invention concerns a particular arrangement for accomplishing the latter.

BRIEF DESCRIPTION OF THE DRAWING

The above referred to and other aspects of the invention will be described with reference to a preferred embodiment of the invention shown in the accompanying Drawing in which:

In FIGS. 1 and 2, the same or similar elements are identified by the same reference numbers.

DETAILED DESCRIPTION OF THE PREFERRED EMBODIMENT

Figure 1:
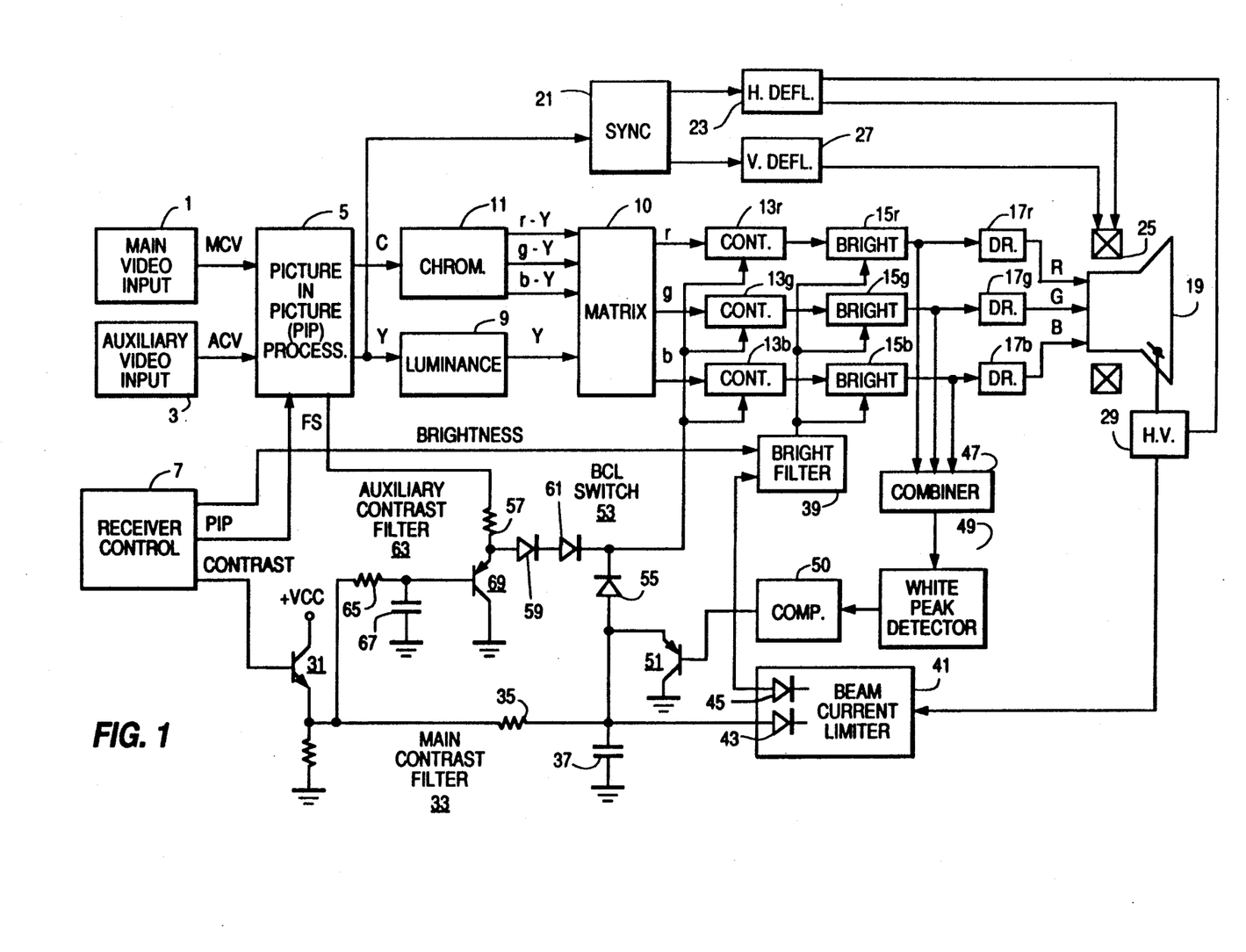
FIG. 1 is a schematic diagram, partially in block form, of a television receiver including a PIP system and a BCL arrangement constructed in accordance with the invention.

The PIP television receiver shown in FIG. 1 includes a "main" video signal input section 1 which provides a "main" composite video (MCV) signal including luminance, synchronization and modulated chrominance components and an auxiliary video signal input section 3 which provides an auxiliary composite video (ACV) signal. Either one or both of main auxiliary video input sections 1 and 3 may comprise a tuner, IF and demodulator section for deriving a baseband composite video signal from a received RF television signal or simply a baseband composite video signal input section to which a video cassette recorder, video disc player or other video signal source may be connected. The MCV and ACV signals are coupled to a PIP processing section 5. PIP processing section 5 produces a combined baseband luminance signal (Y) and a combined modulated chrominance signal (C) at respective outputs. In a PIP mode of operation, the combined Y and C signals represent a main or a big picture and auxiliary or small picture inserted within the main picture. A PIP mode of operation is selected in response to a control signal generated by a receiver control unit 7 in response to a user initiated command entered via a remote control unit (not shown). The MCV or ACV may be selectively exchanged to serve as the signals from which the main and small pictures are derived. In a normal or non-PIP mode of operation, the auxiliary or small picture is eliminated and only the main or big picture is displayed.

Figure 1A:
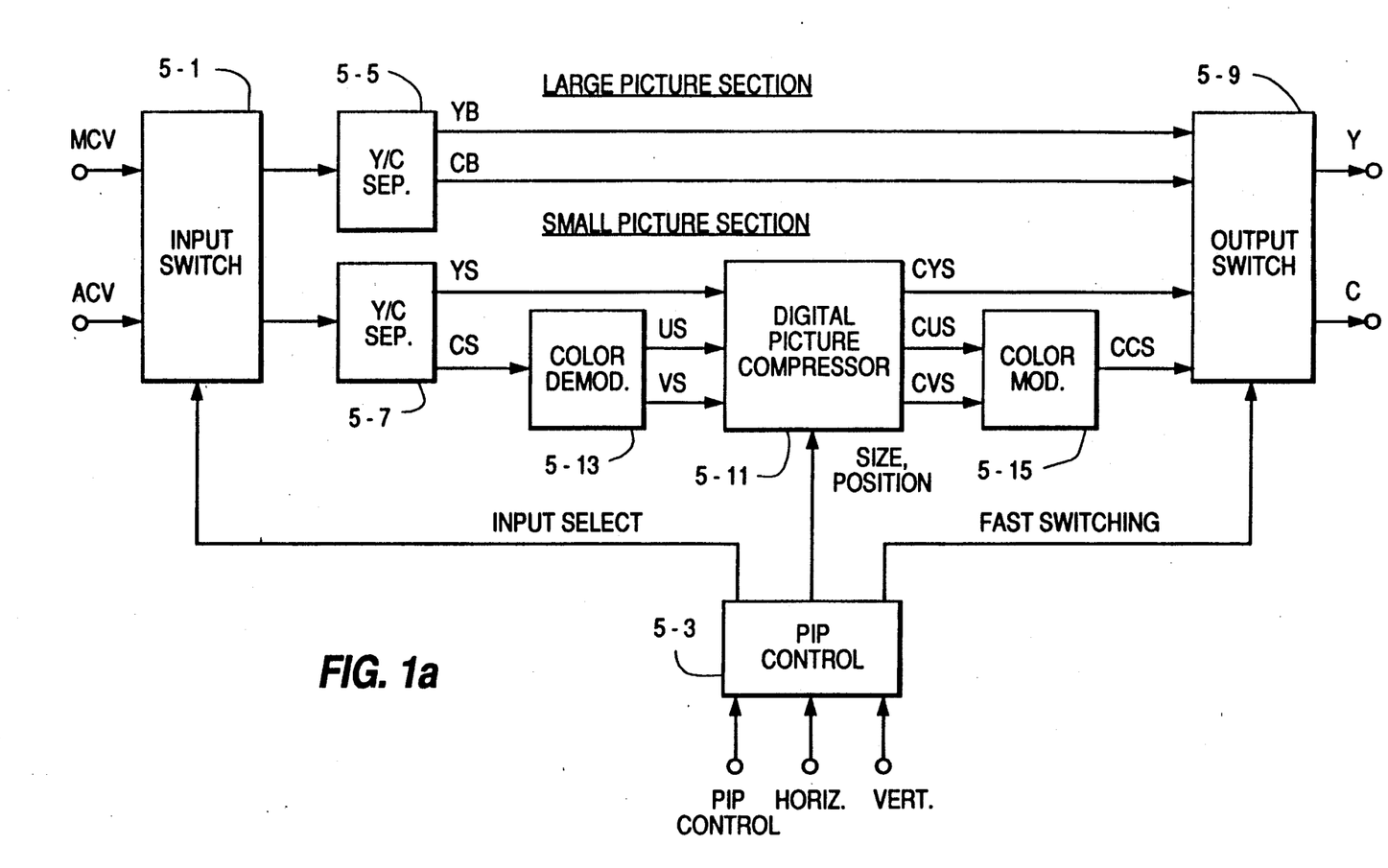
FIG. 1a is a block diagram of an implementation of a PIP system which may be employed in the television receiver shown in FIG. 1.

A block diagram of an implementation of PIP processor 5 is shown in FIG. 1a. As shown in FIG. 1a, PIP processor 5 includes an input switch 5-1 which selects one of the MCV or ACT signals coupled to its inputs for the big picture and the other signal for the small picture. Switch 5-1 is controlled by a control unit 5-3 which receives digital PIP control words, in serial format, from receiver control unit 7 (shown in FIG. 1). The digital control words also control the location and size of the small picture.

A Y/C separator 5-5 having an input coupled to one output of input switch 5-1 provides separated luminance (YB) and chrominance (CB) signal components corresponding to the big picture and a Y/C separator 5-7 coupled to the other output of input switch 5-1 provides separated (YS) and chrominance (CS) signal components corresponding to the small picture. The YB and CB output signals of Y/C separator 5-1 are coupled to respective inputs of an output switch 5-7.

The YS output signal of Y/C separator 5-7 is coupled directly to a digital picture compressor 5-11. The CS output signal of Y/C separator 5-7 is demodulated in a color demodulator 5-13 to produce color difference (US and VS) signals. The US and VS signals are also coupled to digital picture compressor 5-11. Picture compressor 5-11 includes a memory and compresses each of signal components it receives in the vertical direction by deleting lines and in the horizontal direction by deleting pixels to form a compressed luminance component (CSY) and two compressed color difference signals (CUS and CVS) corresponding to the small picture. The compressed signals are stored in the memory of digital compressor 5-1 and "read-out" of the memory in synchronism with horizontal-rate and vertical-rate sync pulses generated by deflection units of the receiver (shown in FIG. 1) at the appropriate time under the control of PIP control unit 5-3 in order to properly position the small picture relative to the big picture. A color modulator 5-15 modulates the compressed color difference signals (CUS and CVS) onto a color subcarrier to form the chrominance signal (CCS) for the small picture.

The CYS and CCS signals are coupled to respective inputs of output switch 5-9. PIP control unit 5-3 generates a "fast" (video rate) switching (FS) signal which controls switch 5-9 so that small picture video signals CYS and CCS are substituted for the big picture video signals YB and CB at the proper time to form the combined Y and C output signals of PIP processor 5.

Returning to FIG. 1, the luminance output signal (Y) of PIP processor 5 is coupled to a luminance signal processing unit which performs signal processing operations such as peaking and non-linear "black-stretch" control. The output signal of luminance signal processing unit 9 is coupled to a matrix 10. The chrominance signal output signal (C) of PIP processor 5 is coupled to a chrominance signal processing unit 11 which performs signal processing operations such as color demodulation, and color saturation and tint and produces green and blue color difference (r-Y, the g-Y and b-Y) signals. The r-Y, g-Y and b-Y signals are coupled to matrix 10. Matrix 10 combines the Y signal with the r-Y, g-Y and b-Y signals to produce low level red, green and blue color (r, g, b) signals.

The r, g and b signals are applied to respective contrast sections 13r, 13g and 13b. The output signals of contrast sections 13r, 13g and 13b are coupled to respective brightness sections 15r, 15g and 15b. The output signals of brightness sections 15r, 15g and 15b are coupled to respective picture tube drivers 17r, 17g and 17b which produce high level red, green and blue drive (R, G, and B) signals. The R, G and B signals are coupled to respective electron guns of a picture tube 19. Contrast sections 13r, 13g and 13b control the peak-to-peak amplitude of the R, G and B signals coupled to picture tube 19. Brightness sections 15r, 15g and 15b control the DC level of the R, G and B signals.

The Y output of PIP processor 5 is also coupled to a synchronization ("sync") separator which derives horizontal and vertical sync signals. The horizontal sync signal is coupled to a horizontal deflection section 23 which supplies horizontal deflection signals to deflection coils 25 associated with the picture tube 19. The vertical sync signal is coupled to a vertical deflection section 27 which supplies vertical deflection signals to deflection coils 25. The horizontal deflection signals are also coupled to a high voltage section 29 which supplies high operating voltages to picture tube 19.

While various ones of the sections described above are shown separately, they may be incorporated in one or more integrated circuits (ICs). For example, luminance signal processing section 9, chrominance signal processing section 11, sync separator 21 and portions of deflection sections 23 and 27 may comprise respective sections of a TA8680 IC available from Toshiba Corporation. Matrix 9, contrast sections 13r, 13g and 13b, and brightness sections 15r, 15g and 15b may comprise respective sections of a TA7730 IC also available from Toshiba Corporation.

In addition to PIP processing section 5, receiver control unit 7 controls various other sections of the television receiver such as contrast sections 13r, 13g and 13b and brightness sections 15r, 15g and 15b in response command signals initiated by a user via a remote control unit (not shown). Control unit 7 includes a microprocessor operating under the control of a stored program. For contrast sections 13r, 13g and 13b and brightness sections 15r, 15g and 15b control unit 7 generates respective pulse signals encoded in binary rate or pulse width format in accordance with the user's performances. The pulse signals are filtered to produce respective analog contrast and brightness control signals.

The contrast control pulse signal is coupled via an emitter-follower configured NPN transistor 31 to a low pass filter 33 including a series-connected resistor 35 and a shunt-connected capacitor 37. The contrast control analog signal is developed across capacitor 37 and coupled to respective contrast control inputs of contrast sections 13r, 13g and 13b through a switching arrangement provided in accordance with an aspect of the present invention, as will be described in detail below. The brightness control analog signal for brightness sections 15r, 15g and 15b is generated in a similar manner by an arrangement including a low-pass filter arrangement 39 in response to a brightness control pulse signal generated by control unit 7.

As earlier noted, it is desirable to limit the electron beam current in order to prevent "white spot blooming". To this end, in the television receiver shown in FIG. 1, a beam current limiting (BCL) section 41 monitors the average current drawn by the picture tube from high voltage power supply 29 and, in response, generates control signals for reducing the contrast and brightness of the reproduced images when the beam current exceeds a predetermined threshold. U.S. Pat. No. 4,167,025 entitled AUTOMATIC PEAK BEAM CURRENT LIMITER by D. H. Willis, issued on Sep. 4, 1979 discloses a suitable arrangement for BCL section 41. It is desirable to reduce the contrast of the image before reducing the brightness of the image because contrast changes are subjectively less noticeable to viewers than brightness changes. This sequential operation is established by threshold devices associated with BCL unit 41 which are represented in FIG. 1 by diodes 43 and 45. The BCL contrast and brightness control signals generated by BCL section 41 are coupled to respective ones of contrast control voltage filter 33 and brightness control voltage filter 39. In the exemplary embodiment, BCL brightness reduction is considered an "emergency" measure and therefore rarely occurs except when the beam current is exceptionally high.

In addition to the average beam current responsive beam current limiting provided by BCL section 41, the peak drive level is limited to a predetermined value since electron beam spot size expands non-linearly at higher beam current amplitudes. This is accomplished by sensing the peak of a signal representative of the luminance component of the image produced by picture tube 19. Specifically, a combining circuit 47 combines (e.g., adds) the processed r, g and b color signals produced by brightness sections 15r, 15g and 15b to produce a signal representative of the luminance component of the displayed image. The output signal of combining circuit 47 is coupled to a peak detector 49 which detects the peak of the white-going portion of the luminance representative signal provided by the combining circuit 47. The white-peak representative output signal of peak detector 49 is coupled to a threshold comparator 50 which generates a control signal for reducing the contrast of the reproduced image when the detected white-peak exceeds a predetermined threshold. The contrast control signal produced by comparator 50 is coupled by an emitter-follower configured PNP transistor 51 to filter capacitor 37 of contrast control voltage filter 33 where it is filtered and combined with the user responsive and BCL contrast control signals to form a combined contrast control signal. The combined contrast control signal is coupled to respective contrast control inputs of contrast sections 13r, 13g and 13b. The white-peak responding arrangement operates to reduce the amplitudes of the r, g and b signals when their combination corresponds to an excessively peak white image. Such automatic contrast control (which also may be called "auto-pix", "pix" being an abbreviation for "picture") prevents loss of detail sharpness in highlight (white) areas due to blooming, while permitting high contrast (and therefore subjectively bright) images when the signal peaks remain below the blooming threshold.

The television receiver described so far with respect to FIG. 1 may be constructed in a manner similar to RCA brand name television receivers employing CTC-169 electronic chassis described in the publications entitled "RCA/GE Color Television Basic Service Data CTC 169 (DV)" and "The CTC 168/169 Technical Training Manual", both published in 1990 by Thomson Consumer Electronics, Inc., Indianapolis, Ind.

In the television shown in FIG. 1, the nominal gain of the video channels which produce the R, G and B signals coupled to picture tube 19 is set relatively high in order to produce high contrast images and therefore subjectively bright images. As earlier noted, under such conditions BCL section 41 will operate to reduce image contrast during a significant amount of time during the reception of normal program material. This operation may be detrimental to the visibility of he small picture because the small picture undergoes the same contrast reduction as the big picture. The detrimental effect of contrast BCL operation occurs independently of whether the average picture level of the small picture is low or high because the small picture contributes very little to the average beam current due to the relatively small area of the small picture compared to the big picture. The remaining portion of the television receiver shown in FIG. 1 concerns an arrangement constructed in accordance with an aspect of the invention for inhibiting BCL contrast reduction during the time that the small picture is being displayed.

The arrangement for inhibiting BCL contrast reduction during the time interval in which the small picture is being displayed includes a switching section 53 coupled between the contrast control output (diode 43) of BCL section 41 and the contrast control inputs of contrast sections 14r, 13g and 13b. Switching section 53 comprises a diode 55 connected in series between filter capacitor 37 of contrast control voltage filter 33 and the contrast control inputs of contrast sections 13r, 13g and 13b, and a resistor 57 and diodes 59 and 61 connected in series between the "fast" switching (FS) signal output PIP processor 5 and the cathode of diode 55. The arrangement also includes a second or auxiliary low pass filter 63, including a series-connected resistor 65 and a shunt-connected capacitor 67, coupled to the output (emitter electrode) of emitter-follower configured NPN transistor 31. The output signal of auxiliary contrast control filter 63 developed across filter capacitor 67 is coupled to the junction of resistor 57 and the anode of diode 59 via an emitter-follower configured PNP transistor 69. Emitter-follower configured PNP transistor 69, which utilizes resistor 57 as its load resistor, also comprises a part of switching section 53. Second or auxiliary filter 63 develops a second or auxiliary analog contrast control voltage representative of the user's contrast control preference. The auxiliary contrast control voltage has substantially the same level as that portion of the first or main contrast control voltage developed across capacitor 37 which represents the user's contrast control preference (without contribution from BCL section 41 and white-peak detector 49).

In operation, while the big picture is being displayed, diode 55 is forward biased and therefor conductive, and diodes 59 and 61 and transistor 69 are reverse biased and therefore non-conductive by virtue of the relatively low level (e.g., approximately 0 volts) of the FS signal and the relatively high level of main control voltage developed across capacitor 37. As a result, the main control voltage, which corresponds to the combination of the user responsive contrast control signal, the BCL control signal and the automatic contrast control signal, is coupled to the control inputs of contrast sections 13r, 13g and 13b. However, while the small picture is being displayed, the level of the FS signal is a relatively high (e.g., +12 volts). This causes diodes 59 and 61 and transistor 69 to be forward biased and therefore rendered conductive and diode 55 to be reverse-biased and therefore rendered non-conductive. As a result, the main control signal, including the BCL and automatic contrast control contributions, is decoupled from the control inputs of contrast sections 13r, 13g and 13b and the auxiliary control signal, representing only the user's contrast control preference, is coupled to the control inputs of contrast control sections 13r, 13g and 13b instead. The voltage drop across diode 59, which is poled in opposition to the base-emitter junction of PNP transistor 69, compensates for the voltage drop across the base-emitter junction of transistor 69. The voltage drop across diode 61 substantially matches the voltage drop across diode 55 and therefore aids in equalizing the auxiliary contrast control voltage with that portion of the main contrast control voltage which represents the user's contrast control preference. In this manner, BCL contrast reduction which might otherwise reduce the visibility of the small picture is avoided.

It is noted that while the BCL operation is disabled during the time interval in which the small picture is being displayed, the main control voltage developed across filter capacitor 37 of main low pass filter 33 continues to be responsive to the average beam current drawn by picture tube 19 throughout the entire image interval, including the time interval in which the small picture is being displayed. Accordingly, the BCL control signal for the big picture is not disturbed and continues to represent the beam current drawn for the entire image.

Figure 2:
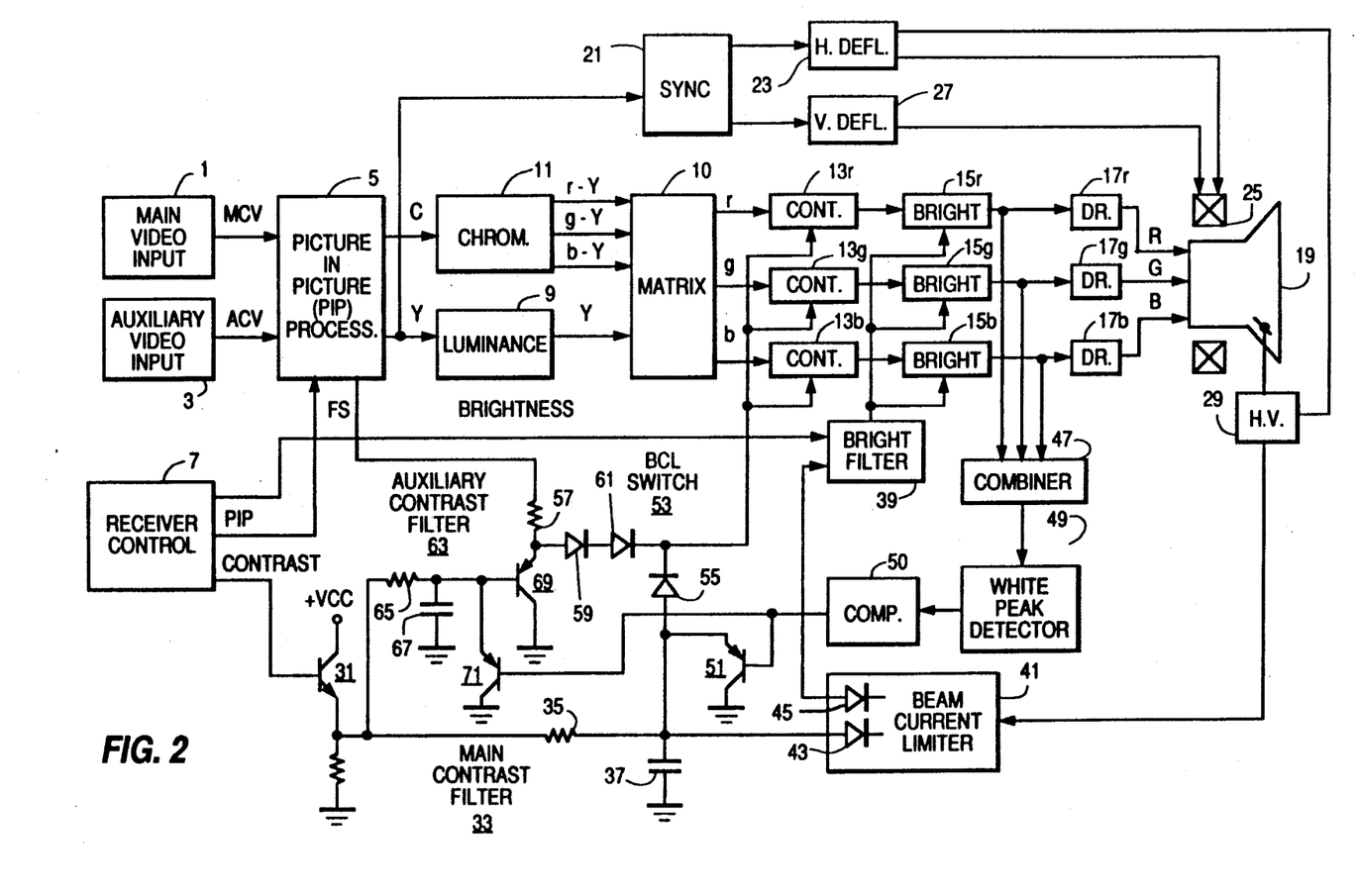
FIG. 2 is a schematic diagram, partially in block form, of the television receiver shown in FIG. 1, modified in accordance with another aspect of the invention.

In the arrangement shown in FIG. 1, both the BCL and automatic contrast reduction operations are disabled while the small picture is being displayed. However, it may be desirable to provide for some beam current limiting action in response to excessive peak-white video signals because the beam current increases nonlinearly in response to high level video signals. Accordingly, the arrangement shown in FIG. 2 includes provisions for maintaining the peak-white automatic contrast control reduction operation while the small picture is being displayed. Specifically, an additional emitter-follower configured PNP transistor 71 is coupled between the output of comparator 50 and the junction of resistor 65 and capacitor 67 of auxiliary low pass filter 63. As a result, the automatic contrast control voltage generated by white peak detector 49 will be coupled to the control inputs of contrast sections 13r, 13g and 13b, together with the auxiliary control voltage representative of the user's contrast control preference, while the small picture is being displayed.

In summary, an arrangement has been described for modifying the operation of apparatus for limiting the beam current drawn by a picture tube of a television system including PIP provisions during the time interval in which the small picture is being displayed so that the visibility of the small picture does not suffer. In the preferred embodiment which has been described, one or both of the beam current responsive and video signal responsive automatic contrast control sections are disabled and a fixed control signal, preferably corresponding to the user's contrast control preference, is substituted for the variable control signal generated by the beam current limiting section.

It will be appreciated by those skilled in the art that other related measures for improving the visibility of the small picture may additionally or alternatively be employed. For example, the contrast may actually be increased during the time period in which the small picture is being displayed. In addition, in the described television system, the disabling arrangement is only associated with the contrast control section of the receiver because it is assumed that brightness beam limiting rarely occurs except at exceptionally high beam currents. However, in other television system in which brightness beam current limiting may occur more frequently, it may be desirable to employ an arrangement similar to the one described with respect to the contrast BCL section for disabling the brightness BCL section. Further, while an auxiliary or second filter is provided for generating an auxiliary contrast control signal which is substituted for the main control signal, it is possible to dispense with such an auxiliary filter in configurations in which the contrast control pulse signal and BCL contrast control signal are not filtered by the same filter capacitor but are rather filtered by separate filter capacitors and the resulting filtered control signals are combined. In that case, it is necessary only to decouple the BCL contrast control signal filter from the combining section while the small picture is being displayed. Still further, while the disabling arrangement has been described with respect to a PIP system in which a small picture is inserted within a bigger picture the disabling arrangement is also applicable to a system in which a small picture is located in other positions with respect to a large picture, such as adjacent to a big picture in a so called POP (picture outside of picture) configuration. Additionally, while the present invention has been described in terms of direct view type of television, the invention could also be used in a projection type of television system employing separate picture tubes for red, green and blue images. The use of the invention in projection television systems is particularly advantageous since projection tend to be operated with exceptional high video channel gains to maintain a relatively high average picture brightness. This tends to cause the BCL arrangement to be operative during even more significant amounts of time. It is further noted that the present invention may also be employed in a television monitor system which does not include a tuner. These and other modifications are considered to be within the scope of the present invention defined by the following claims.

I claim:

1. A television system comprising:
    a picture tube for producing images in response to video signals coupled to it;
    a video signal processing channel including means for controlling a characteristics of said video signals coupled to said picture tube in response to a characteristic control signal;
    means, including a beam current limiting (BCL) arrangement responsive to the beam current drawn by said picture tube, for generating said characteristic control signal;
    means responsive to a main video signal and to an auxiliary video signal and coupled to said video signal processing channel for causing a main picture and an auxiliary smaller picture to be displayed within the same image, said means for causing said main and auxiliary pictures to be displayed generating a signal indicative of the time interval in which said auxiliary picture is displayed; and
    means coupled to said BCL arrangement and responsive to said signal indicative of the time interval said auxiliary picture is displayed for modifying the operation of said BCL arrangement during the time interval said auxiliary picture is displayed.

2. The television system defined in claim 1, wherein:
    said BCL arrangement generates a BCL control signal from which said characteristic control signal is derived; and
    said means for modifying includes mean for selectively inhibiting said means for controlling said characteristic of said video signals coupled to said picture tube from responding to said BCL control signal during the time interval in which said auxiliary picture is displayed.

3. The television system defined in claim 2, wherein:
    said means for generating said characteristic control signal includes means for generating an additional control signal, and means for combining said additional control signal with said BCL control signal to derive said characteristic control signal; and
    said means for modifying includes means for substituting a substitute control signal for said characteristic control signal during the time interval in which said auxiliary picture is displayed.

4. The television system defined in claim 3, wherein:
    said substitute control signal is substantially equal to said additional control signal.

5. The television system defined in claim 4, wherein:
    said additional control signal is adjustable in accordance with a user's preference for said characteristic.

6. The television system defined in claim 5, wherein:
    said means for generating said additional control signal includes a source of pulse signals encoded in accordance with the user's preference, and a first filter for filtering said pulse signal to produce said additional signal;
    said means for combining said additional control signal and said BCL control signal includes a potion of said first filter; and
    said means for substituting includes a second filter for filtering said pulse signal to produce said substitute signal.

7. The television system defined in claim 1, wherein:
    said BCL arrangement generates a BCL control signal from which said characteristic control signal is derived; and
    said means for modifying includes means for substituting a substitute control signal for said characteristic control signal during the time interval in which said auxiliary picture is displayed.

8. The television system defined in claim 1, wherein:
    said video signal processing channel includes means for controlling the peak-to-peak amplitude of said video signals coupled to said picture tube and thereby the contrast of images produced by said picture tube;
    said means for generating a characteristic control signal includes means for generating a contrast characteristic control signal for controlling the peak-to-peak amplitude of said video signals coupled to said picture tube;
    said BCL arrangement generates a BCL contrast control signal from which said contrast characteristic control signal is derived; and
    said means for modifying includes mean for inhibiting said means for controlling the peak-to-peak amplitude of said video signals coupled to said picture tube from responding to said BCL contrast control signal during the time interval in which said auxiliary picture is displayed.

9. The television system defined in claim 1, wherein:
    said video signal processing channel includes means for controlling the peak-to-peak amplitude of said video signals coupled to said picture tube and thereby the contrast of images produced by said picture tube, and means for controlling the DC level of said video signals coupled to said picture tube and thereby the brightness of images produced by said picture tube;
    said means for generating a characteristic control signal includes means for generating a contrast characteristic control signal for controlling the peak-to-peak amplitude of said video signals coupled to said picture tube, and means for generating a brightness control signal for controlling the DC level of said video signals coupled to said picture tube;
    said BCL arrangement generates a BCL contrast control signal from which said contrast characteristic control signal is derived, and a brightness BCL control signal from which said brightness characteristic is derived; and
    said means for modifying includes mean for inhibiting said means for controlling the peak-to-peak amplitude of said video signals coupled to said picture tube from responding to said BCL contrast control signal but does not inhibit said means for controlling the DC level of said video signals coupled to said picture tube from responding to said BCL brightness control signal during the time interval in which said auxiliary picture is displayed.

10. The television system defined in claim 1, wherein:
    said BCL arrangement generates a BCL control signal from which said characteristic control signal is derived in response to the beam current drawn by said picture tube; and
    said means for modifying includes mean for inhibiting said means for controlling said characteristic of said video signals coupled to said picture tube from responding to said BCL control signal without disturbing the generation of said BCL control signal in response to the beam current drawn by said picture tube during the time interval in which said auxiliary picture is displayed.

11. The television system defined in claim 10, wherein:

said means for generating said characteristic control signal includes means for storing said characteristic control signal coupled to said means for controlling said characteristic of said video signals coupled to said picture tube, said BCL control signal being coupled to said means for storing; and said means for modifying includes means for selectively decoupling said storing means from said means for controlling said characteristic of said video signals coupled to said picture tube during the time interval in which said auxiliary picture is displayed.

12. The television system defined in claim 11, wherein:

said means for generating said characteristic control signal includes means for generating an additional control signal, said additional control signal being combined with said BCL control signal by said means for storing to derive said characteristic control signal; and said means for modifying includes means for substituting a substitute control signal for said characteristic control signal during the time interval in which said auxiliary picture is displayed.

13. The television system defined in claim 1, wherein:

said BCL arrangement generates a BCL control signal;

said means for generating said characteristic control signal also includes means for generating an additional control signal in response to said video signals coupled to said picture tube, and means for coupling said BCL control signal and said additional control signal to said means for controlling said characteristic of said video signals coupled to said picture tube, said means for controlling said characteristic of said video signals coupled to said picture tube normally responding to both of said BCL and additional control signals to limit the beam current drawn by said picture tube; and said means for modifying includes mean for selectively inhibiting said means for controlling said characteristic of said video signals coupled to said picture tube from responding to said BCL control signal but does not inhibit said means for controlling said characteristic of said video signals coupled to said picture tube from responding to said additional control signal during the time interval in which said auxiliary picture is displayed.

14. The television system defined in claim 13, wherein:

said means for controlling said characteristic of said video signals coupled to said picture tube controls the peak-to-peak amplitude of said video signals; and said means for generating said additional control signal includes a peak detector.

15. The television system defined in claim 2, wherein:

said means for generating said characteristic control signal also includes means for generating an additional control signal in response to said video signals coupled to said picture tube, and means for combining said additional control signal with said BCL control signal to derive said characteristic control signal; and said means for modifying includes means for selectively decoupling said characteristic control signal from said means for controlling said characteristic during the time interval in which said auxiliary picture is displayed.

16. The television system defined in claim 15, wherein:

said means for controlling said characteristic of said video signals coupled to said picture tube controls the peak-to-peak amplitude of said video signals; and said means for generating said additional control signal includes a peak detector.

17. The television system defined in claim 16, wherein:

said means for modifying includes means for selectively substituting said additional control signal for said characteristic control signal during the time interval in which said auxiliary picture is displayed.

18. The television system defined in claim 1, wherein:

said means for causing a main picture and an auxiliary smaller picture to be displayed within the same image causes said auxiliary signal to be displayed within said main picture in a "picture-in-picture" configuration.

19. A television system comprising:

a picture tube for producing images in response to video signals coupled to it;

a video signal processing channel including means for controlling a characteristics of said video signals coupled to said picture tube in response to a characteristic control signal;

a user adjustable means for generating a user responsive control signal;

beam current limiting (BCL) means responsive to the beam current drawn by said picture tube for generating a BCL control signal;

generating means responsive said said user responsive control signal and said BCL control signal for generating said characteristic control signal;

picture-in-picture means responsive to a main video signal and to an auxiliary video signal and coupled to said video signal processing channel for causing a small auxiliary picture to be displayed within a bigger main picture, said picture-in-picture means generating a signal indicative of the time interval in which said auxiliary picture is displayed; and means coupled to said generating means and responsive to said signal indicative of the time interval said auxiliary picture is displayed for modifying the operation of said generating during the time interval in which said auxiliary picture is displayed.

20. A television system comprising:

a picture tube for producing images in response to video signals coupled to it by said video signal processing channel;

a video signal processing channel including means for controlling a characteristics of said video signals coupled to said picture tube in response to a primary characteristic control signal;

a user adjustable means for generating a user responsive characteristic control signal;

beam current limiting (BCL) means responsive to the beam current drawn by said picture tube for generating a BCL control signal;

generating means responsive said user responsive control signal and said BCL control signal for generating a primary characteristic control signal, said primary control signal being normally coupled to said means for controlling said characteristics of said video signals coupled to said picture tube;

picture-in-picture means responsive to a main video signal and to an auxiliary video signal and coupled to said video signal processing channel for causing a small auxiliary picture to be displayed within a bigger main picture, said picture-in-picture means generating a signal indicative of the time interval in which said auxiliary picture is displayed; and means coupled to said generating means and responsive to said signal indicative of the time interval said auxiliary picture is displayed for substituting a secondary characteristic control, at least approximating said user responsive control signal, for said primary characteristic control signal during the time interval in which said auxiliary picture is displayed.

* * * * *